United States Patent [19]

Miyazawa et al.

[11] Patent Number: 5,232,710

[45] Date of Patent: Aug. 3, 1993

[54] MULTI-PLY MOLDING HOT-RUNNER MOLD

[75] Inventors: Yoshiki Miyazawa, Ueda; Yoshihiro Fukunishi, Komoro; Hidehiko Fukai, Nagano, all of Japan

[73] Assignee: Nissei ASB MAchine Co., Ltd., Nagano, Japan

[21] Appl. No.: 729,327

[22] Filed: Jul. 12, 1991

[30] Foreign Application Priority Data

Jul. 16, 1990 [JP] Japan .................. 2-188299

[51] Int. Cl.⁵ .......................... B29C 45/16
[52] U.S. Cl. ........................ 425/130; 264/406; 264/328.8; 264/328.14; 425/144; 425/549; 425/570; 425/572; 425/573
[58] Field of Search ............. 425/130, 549, 570, 572, 425/573, 588, 143, 144; 264/40.6, 328.8, 328.14

[56] References Cited

U.S. PATENT DOCUMENTS

| 4,900,560 | 2/1990 | Trakas | 425/549 |
| 4,957,682 | 9/1990 | Kobayashi et al. | 425/130 |
| 5,030,077 | 7/1991 | Orimoto et al. | 425/562 |

FOREIGN PATENT DOCUMENTS

| 0246512 | 11/1987 | European Pat. Off. |
| 0291640 | 11/1988 | European Pat. Off. |
| 0325440 | 7/1989 | European Pat. Off. |
| 0374247 | 6/1990 | European Pat. Off. |
| 2322000 | 3/1977 | France |
| 61-268421 | 11/1986 | Japan |

Primary Examiner—Tim Heitbrink
Attorney, Agent, or Firm—Oliff & Berridge

[57] ABSTRACT

The present invention provides a multi-ply molding hot-runner mold including a plurality of nozzle bodies for injecting a plurality of different resin materials to form a multi-ply product. The hot-runner mold comprises a plurality of hot-runner blocks each having a runner for conducting each resin material into the corresponding nozzle body. The hot-runner blocks are stacked one above another with a thermal insulation layer therebetween. Each of the hot-runner blocks includes temperature control means for maintaining the hot-runner blocks at its own molding temperature. Connecting blocks for conducting the resin material from the lower block to the upper block are provided between each adjacent hot-runner block. Between each adjacent hot-runner block there are provided holding members and thermal insulation layers.

11 Claims, 5 Drawing Sheets

MULTI-PLY MOLDING HOT-RUNNER MOLD

BACKGROUND OF THE INVENTION

1. Field of the Invention

The present invention relates to a multi-ply molding hot-runner mold for molding an injection molded product of synthetic resin material which has a cross-sectional structure comprising a plurality of layers.

2. Description of the Related Art

A stretch-blow molded bottle is required to have barrier properties against oxygen and carbon dioxide, heat resistance and other properties. To meet these requirements, a three-layered preform structure is formed by injection molding. The preform is blow molded into the bottle. The three-layered structure of the preform has inner and outer layers of structural resin material such as polyethylene terephthalate with an intermediate layer interposed therebetween and made of another resin material. Many hot-runner molds used for injection molding such a multi-ply product are known as from Japanese Utility Model Publication No. Sho 63-37222, Japanese Patent Laid-Open No. Sho 63-107525, Japanese Patent Laid-Open No. Sho 63-221024, Japanese Patent Laid-Open No. Sho 63-239022 and so on.

When a product having a multi-ply cross section is to be injection molded from a combination of different resin materials, a difficulty is encountered in that these resin materials have different molding temperatures. Particularly, polyethylene terephthalate (hereinafter called "PET" has a molding temperature higher by about 50 degrees C. than that of ethylene-vinyl alcohol copolymer (hereinafter called "EV-OH"), an effective barrier material. At temperatures higher than the molding temperature of EV-OH, it degrades or pyrolytically decomposes thereby interrupting the molding process. It is thus required to control the temperatures of the respective runners conducting the different resin materials to corresponding injection ports.

Where a single hot-runner mold includes two hot-runners for conducting two different resin materials as described in Japanese Utility Model Publication No. Sho 63-37222, it is impossible to control temperatures of the respective hot-runners at the respective resin molding temperatures which differ from each other by over 50 degrees C.

On the other hand, Japanese Patent Laid-Open Nos. Sho 63-107525 and 63-239022 disclose hot-runner molds which comprise different pieces for the runners of the respective resin materials. The molds have spacer blocks interposed and stacked between the mold pieces along interface areas. Although the material of the spacer blocks is not understood from these Japanese Patent Laid-Opens, it is reasonable to believe that these blocks are made of metal since they must form runners between the upper and lower blocks. With respect to thermal properties, such structures will not be different from hot-runner molds comprising two runners for the different resin materials. Therefore, even if the hot-runner mold pieces are independently controlled in temperature, a heat exchange will occur between the spacer blocks due to the inter-solid heat transfer. It is thus impossible for the molding temperatures of respective resin materials to be accurately controlled in the respective spacer blocks. It is believed that the separate mold pieces of the prior art permit forming runners by separate grooving of the pieces. However, the prior art does not disclose any mold structure which permits easy control of the different molding temperatures of different resin materials.

SUMMARY OF THE INVENTION

It is therefore an object of the present invention to provide a multi-ply molding hot-runner mold comprising a plurality of hot runners which can be accurately controlled to accommodate molding temperatures of different resin materials passed through or resident in the respective hot runners.

To this end, the present invention provides a multi-ply molding hot-runner mold comprising a nozzle body including a plurality of passages for resin materials, said nozzle body being adapted to merge the flows of resin materials near the exit port thereof; a plurality of hot-runner blocks stacked one above another through thermal insulation layers, each Of said hot-runner blocks including a hot runner formed therein for conducting a resin material from a sprue into the corresponding resin passage in said nozzle body; a connection block partially disposed between each adjacent hot-runner block, said connection block including a runner formed therein for conducting the resin material from the lower hot-runner block to the upper hot-runner block; and a plurality of temperature control means each capable of independently controlling the temperature of each of said hot-runner blocks so as to adapt the hot-runner block for the molding temperature inherent in the respective one of said resin materials.

In accordance with the present invention, each of the hot-runner blocks has a single runner for conducting a resin material from a sprue to the corresponding resin passage in the nozzle body. The hot-runner blocks are arranged so that each is used for a different one of the different resin materials to be molded. Each of the hot-runner blocks can be independently controlled to be adapted to the molding temperature of the corresponding resin material. Further, the hot-runner blocks are stacked one above another separated by thermal insulation layers except in the region in which the connection blocks are located. Therefore, the temperature control for one hot-runner block will not influence to a great degree the temperature of another hot-runner block. This means that a resin material passed through or resident in a hot-runner block can be maintained at its own molding temperature. Since the temperature of each of the blocks can be accurately controlled in accordance with the present invention, the mold can be easily set at appropriate molding temperatures for any different resin material. After the resin materials have been controlled with respect to their molding temperatures, they will be introduced into respective passages in the nozzle body and merged together near the exit port of the nozzle body immediately before injection into a cavity mold.

The thermal insulation layer between the adjacent hot-runner blocks may be provided by an air gap. The thermal insulation layer may be also formed by any other suitable insulating material.

The nozzle body may include a plurality of concentrically arranged passages, the outermost resin passage communicating with the runner in the uppermost block. The central or innermost resin passage may be connected with the runner in the lowermost block. In such a case, it is preferred to provide temperature control means for adjusting the temperature of the nozzle body to a level approximate to the temperature of the uppermost block. As a result, the temperature of a resin material flowing in the outermost resin passage of the nozzle body can be adjusted to its molding temperature by the temperature control means. A resin material flowing in an inner resin passage may be thermally insulated from the uppermost block by the resin material flowing in an outer resin passage.

It is also preferred that the nozzle body include a recess communicating with the exit port, the recess being formed on the side of the nozzle body which is engaged by an injection cavity mold. The resin material is cooled and solidified in this recess to form a thermal insulating layer of resin material between the nozzle body and the cavity mold.

It is further preferred that the nozzle body include a ring-shaped slit formed therein at a position encircling the exit port of the nozzle body, the slit communicating with the aforementioned recess. The resin material may cool and solidify in such a ring-shaped slit to form a thermal insulating layer around the exit port of the nozzle body.

If the connecting block includes temperature control means for adjusting its temperature to a level approximate to the temperature of the lower block, the resin material conducted through the lower block may be controlled in temperature up to a position nearer the nozzle body.

If the top end of the connection block is embedded in a hole of the upper block with its temperature control means being located in the top end side of the connection block, the temperature of the resin material conducted through the lower block may be controlled more accurately.

If an air gap is formed between the sidewall of the top end of the connection block and the inner wall of the hole of the upper block, the thermal affection from the upper block to the connection block may be reduced.

A mold with a plurality of nozzle bodies each with a connection block between an adjacent hot-runner block can be used to simultaneously injection mold a plurality of products. In such a case, a runner is formed in each stacked hot-runner block so that a resin material can be conducted from a single sprue into the passages of a plurality of nozzle bodies. The runners in the respective blocks may be formed and arranged in a tournament-table configuration so that the length of each of the runners from the single sprue to the plurality of nozzle bodies is equal. With this configuration, a temperature control means may be set to provide the same temperature to all passages connected with respective nozzle bodies.

DETAILED DESCRIPTION OF THE PREFERRED EMBODIMENTS

The present invention will now be described in detail in connection with one embodiment thereof which is applied to a hot-runner mold used for injection molding a three-ply product from two different resin materials.

Figure 1:
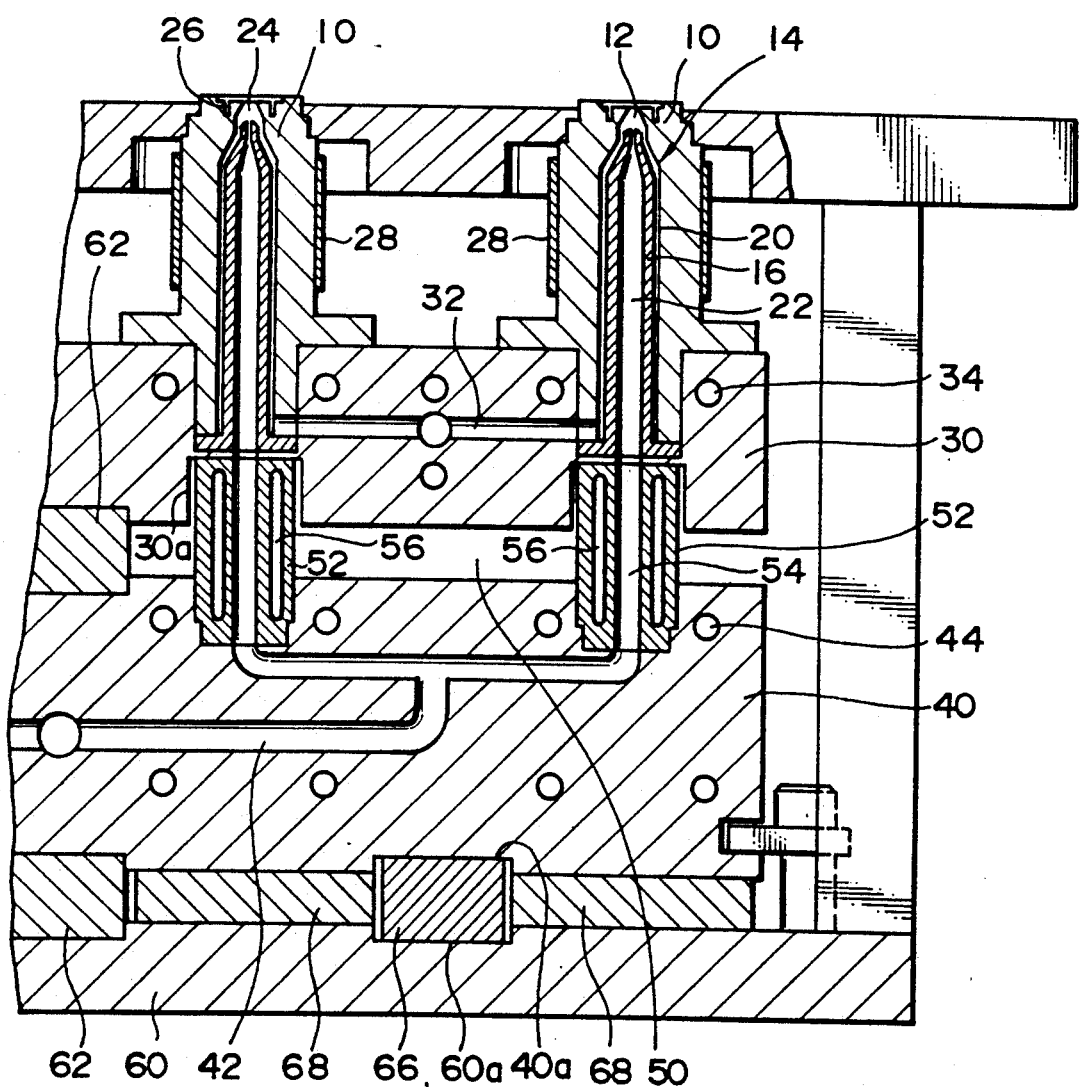
FIG. 1 is a schematic cross-section of one embodiment of a pressure-balance type hot-runner mold constructed in accordance with the present invention.

Referring to FIG. 1, the hot-runner mold is adapted to injection mold a preform which is a primary molding used for forming a final bottle-shaped product. The hot-runner mold mainly comprises nozzle bodies 10, first and second hot-runner blocks 30, 40 for receiving the respective one of two different resin materials, an air gap 50 for thermal insulation between the first and second blocks 30 and 40, and connection blocks 52 for forming resin passages between the first and second blocks 30 and 40.

Each of the nozzle bodies 10 is of a cylindrical configuration, with the top end thereof including an exit port 12. The cylindrical nozzle body 10 includes a central bore 14 formed axially therethrough and communicating with the exit port 12. The central bore 14 receives a cylindrical hollow torpedo 16 which is centrally disposed spaced away from the inner wall of the bore 14 to form a first, annular resin passage 20 therebetween. The torpedo 16 includes a central bore or second resin passage 22 formed therein. Thus, these first and second resin passages 20 and 22 will define a concentric double-passage means.

Figure 2:
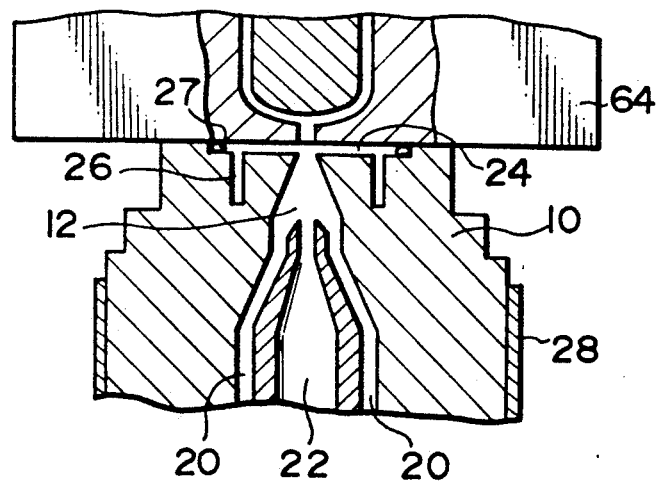
FIG. 2 is an enlarged cross-section of the hot-runner mold shown in FIG. 1, illustrating a portion of the mold near the exit port thereof.

As can be best seen from FIG. 2, the exit port 12 of each nozzle body 10 is opened into a circular recess 24 formed in the nozzle body 10 at the top end thereof. The recess 24 further communicates with a vertically extending ring-shaped slit 26 formed in the top end of the nozzle body 10 to encircle the exit port 12 thereof. The recess 24 receives any sealing means such as a metallic O-ring 27 for preventing any leakage of the resin material.

Each of the first and second hot-runner blocks 30 and 40 is of a rectangular cross-section and includes a first or second runner 32 or 42 formed therein. Each of the first and second runners 32 or 42 serves to connect a sprue (not shown) in the respective one of the blocks 30 and 40 with the first or second resin passage 20 or 22 in each nozzle body 10. The illustrated hot-runner mold can be used in simultaneously injection molding a plurality of products, for example, four moldings.

Each of the runners 32 and 42 is formed such that all the flow passages extending from the sprue (not shown) opened at the side of the corresponding hot-runner block 30 or 40 to the respective resin passages 20 and 22 will have an equal length. Such an arrangement of passages is known as a balance type wherein all the runners are arranged and connected in a tournament-table configuration.

The first and second hot-runner blocks 30 and 40 are vertically stacked one above another through the air gap or thermal insulation layer 50. To this end, the respective hot-runner blocks 30 and 40 are partially engaged and held by a hot-runner pressure receiving plate 62 which is in turn fixedly mounted on a hot-runner holding plate 60. The air gap 50 is formed between the blocks 30 and 40 at a region other than the pressure receiving plate 62 and the connection blocks 52.

The holding plate 60 and the second hot-runner block 40 include key grooves 60a and 40a formed therein. When these key grooves 60a and 40a receive a key 66, the second hot-runner block 40 can be positioned relative to the holding plate 60 in a direction perpendicular to the sheet of the drawing. A thermal insulation layer (or air gap) 68 is formed between the holding plate 60 and the second hot-runner block 40 at a region other than the key-groove connection.

The first and second hot-runner blocks 30 and 40 are vertically spaced away from each other through the air gap 50. Each of the connection blocks 52 includes a third runner 54 formed therein for conducting a resin material from the second or lower hot-runner block 40 into the second resin passage 22 in the corresponding nozzle body 10. The connection block 52 is firmly held between the first and second blocks 30 and 40 by embedding the top and bottom ends thereof in the respective blocks 30 and 40. Particularly, the top end of the connection block 52 extends to a position approximate to the lower end of the corresponding nozzle body 10 in the interior of the first hot-runner block 30. An air gap for thermal insulation is formed between the sidewall of the embedded end of the connection block and the inner wall of the hole 30a in the first hot-runner block 30. Alternatively, such an air gap can be replaced by any other suitable thermal insulation material.

Temperature control means will now be described for each of the resin materials.

Each of the first and second hot-runner blocks 30 and 40 may include first or second internal cartridge type heaters 34 or 44 disposed at a position approximate to the first or second runner 32 or 42. A resin material passed through or resident in the runner 32 or 42 may be maintained at its own molding temperature by corresponding internal heaters 34 or 44. The temperature of each of the first and second heaters 34 and 44 may be independently controlled as by the use of a feedback signal from a thermocouple measuring the temperature of the first and second hot-runner blocks 30 and 40.

Each of the nozzle bodies 10 includes a band heater 28 wound around the outer wall thereof for heating the resin material flowing in the first or outer resin passage 20 of the nozzle body 10. Each of the connection blocks 52 also includes a third internal heater 56 provided therein along the third runner 54.

These internal heaters for heating the blocks 30, 40 and 54 may be replaced by any other suitable heating means such as a combination of heat pipes with internal heaters. In such a case, the heat pipes may be arranged along the respective runners 32, 42 and 54. A heater may be disposed parallel to the corresponding heat pipe or at the end of the heat pipe.

Operation will now be described with respect to the aforementioned arrangement.

Molding temperatures of resin materials which are usable in the present invention include the following:

| PET | 275 degrees C.; |
|---|---|
| Polyacrylate | 280 degrees C.; |
| Polyamide | 270-300 degrees C.; |
| Polypropylene | 200-300 degrees C.; |
| Polycarbonate | 260-300 degrees C.; |
| EV-OH | 190-230 degrees C.; |
| PAN | about 200 degrees C. |

However, the above molding temperatures may vary according to manufacturer and grade of the material used.

In this example, it is assumed that the outer and inner layers of the injection molded product are made of PET resin while the intermediate layer therebetween is made of EV-OH resin.

PET resin is conducted into the first runner 32 of the first hot-runner block 30 through the sprue thereof (not shown). The resin material is then conducted from the first runner 32 to the first resin passage 20 of each of nozzle body 10. EV-OH resin is conducted from the sprue (not shown) of the second hot-runner block 40 through the second and third runners 42 and 54 into the second resin passage 22 of nozzle body 10.

As shown in the above table, the molding temperature of the PET resin is 275 degrees C. while the molding temperature of the EV-OH resin is 230 degrees C. The difference between the molding temperatures of these resins may be as high as 85 degrees C. In the illustrated embodiment, however, the molding temperature of the PET resin can be maintained by first heaters 34 in the first hot-runner block 30 while the molding temperature of the EV-OH resin can be maintained by second heaters 44 in the second hot-runner block 40. Since the hot-runner blocks 30 and 40 are spaced away from each other through the air gap 50, no inter-solid heat transfer will take place except exchange due to convection. This reduces thermal affection from one hot-runner block to the other and results in accurate maintenance of the molding temperatures of the respective resin materials to be injection molded. This is particularly advantageous in that the amount of resin material resident in any of the first and second runners 32 and 42 is equal to a plurality of shots. By the separate control the resin material, particularly EV-OH resin, may be prevented from being pyrolytically decomposed and degraded by thermal affection from another hot-runner block and may be maintained at its own molding temperature before injection. After passing through the second runner 42, the EV-OH resin is conducted into second resin passages 22 of the nozzle bodies 10 through the third runners 54 of the respective connection blocks 52. In this connection, the third heater 56 of each of the connection blocks 52 is controlled to provide a temperature approximate to that of the second heaters 44 in the second hot-runner block 40. Therefore, the EV-OH resin will also be maintained at its own molding temperature in each of the connection blocks 52. Since the top end of each connection block 52 is embedded in the first hot-runner block 30 adjacent the corresponding nozzle body 10 and the resin material flowing in this connection block is controlled in temperature by the third heater 56 immediately before it is conducted into the corresponding nozzle body 10, the pyrolytical decomposition of the EV-OH resin can be minimized. Since there is an air gap of thermal insulation between the connection block 52 and the first hot-runner block 30, the thermal affection of the connection block 52 from the first hot-runner block 30 can be reduced effectively.

The PET and EV-OH resins conducted into the first and second resin passages 20 and 22 in each of the nozzle bodies 10 are merged at a position adjacent the exit port 12 and then injected into the interior of a cavity mold 64, as shown in FIG. 2. The band heater 28 around the outer wall of the nozzle body 10 is controlled to a temperature approximate to the temperature of the first heaters 34 in the first hot-runner block 30 such that the PET resin flowing in the first resin passage 20 of the nozzle body 10 is maintained at its molding temperature. Thus, the moldability of the PET resin can be improved. At the same time, the resin material flowing in the second or inner resin passage 22 can be protected from the thermal affection of the band heater 28 of the nozzle body 10 by the PET resin encircling the torpedo 16. Therefore, the pyrolytical decomposition of the EV-OH resin due to the temperature of the PET resin material can be minimized before the resins are merged near the exit port 12 of the nozzle body 10.

Thermal insulation between each nozzle body 10 and the cavity mold 64 will be described below.

While the nozzle body 10 is maintained at the molding temperature inherent in the PET resin, the temperature of the cavity mold 64 ranges between about 10 degrees C. and about 30 degrees C. Thus, there is a substantial difference in temperature between the nozzle body 10 and the cavity mold 64. In the prior art, thermal insulation was provided between the nozzle body 10 and the cavity mold 64. Such thermal insulation tends to be degraded by heat. Thus, the prior art frequently required replacement of the thermal insulation. If such a replacement is not carried out, the top of the nozzle body 10 is cooled to decrease the temperature of the nozzle portion near the exit port 12, resulting in solidification and clogging of resin material.

In accordance with the illustrated embodiment of the present invention, the resin materials after merging flow into the recess 24 formed in the top face of each of the nozzle bodies 10. Thereafter, the resin materials are cooled and solidified by the cavity mold 64 having a relatively low temperature. Since the resin materials solidified and accumulated in the recess 24 have a relatively low heat transfer property, they can effectively thermally insulate the cavity mold 64 from the nozzle body 10 to prevent the mold portion near the exit port 12 from being cooled to an undesirable temperature. In addition, the illustrated embodiment provides a ring-shaped slit 26 encircling the exit port 12 of the nozzle body 10. The resin materials also flow into this slit 26 wherein the resin materials are cooled and solidified to form a thermal insulation which can effectively thermally insulate the mold portion near the exit port 12. In such a manner, the illustrated embodiment can provide an effective thermal insulation near the exit ports 12 of the nozzle bodies 10 to prevent the clogging of the resin materials, without replacement of any structural member.

Figure 3:
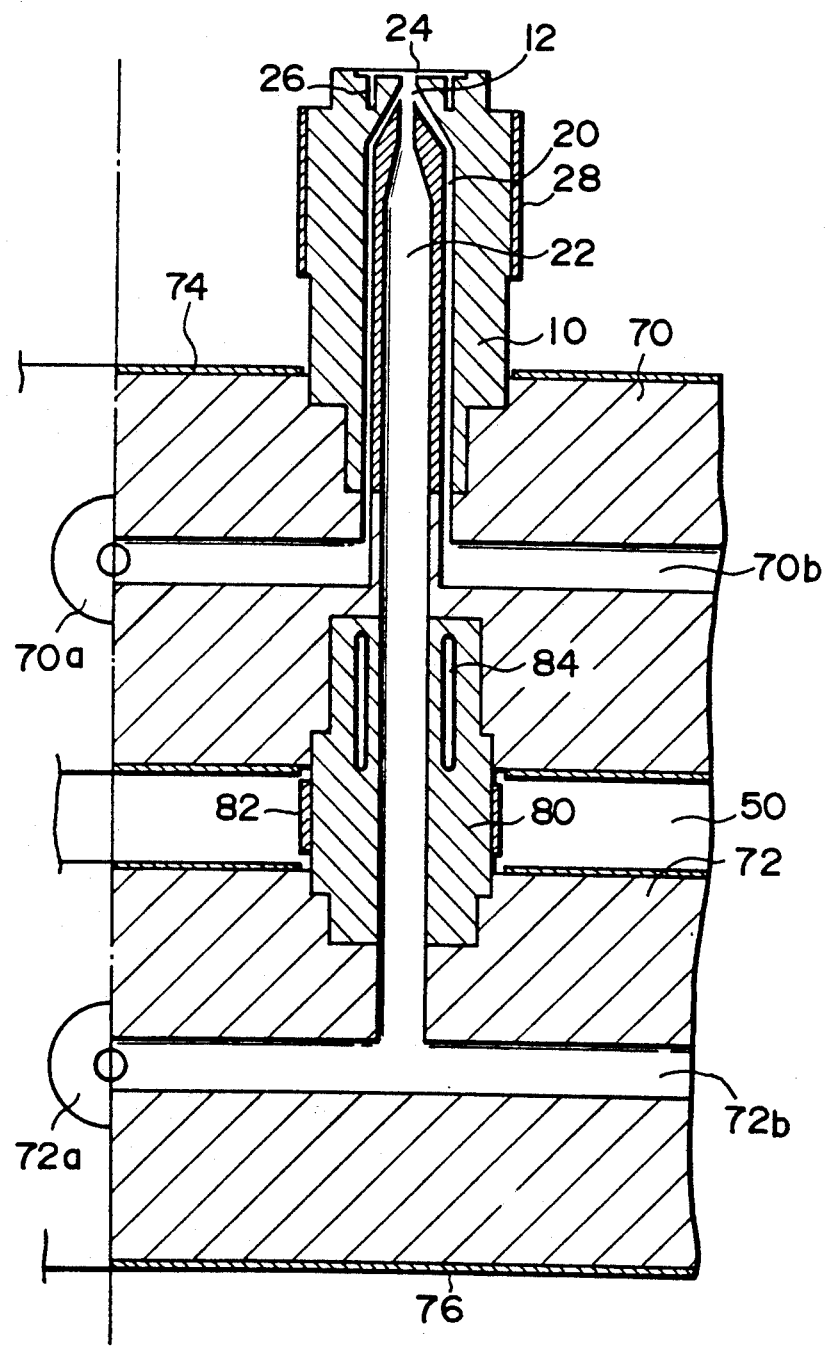
FIGS. 3 and 4 are schematic views of a hot-runner mold having a circular cross-section in vertical and horizontal cross-sections, illustrating another embodiment of the present invention.
Figure 4:
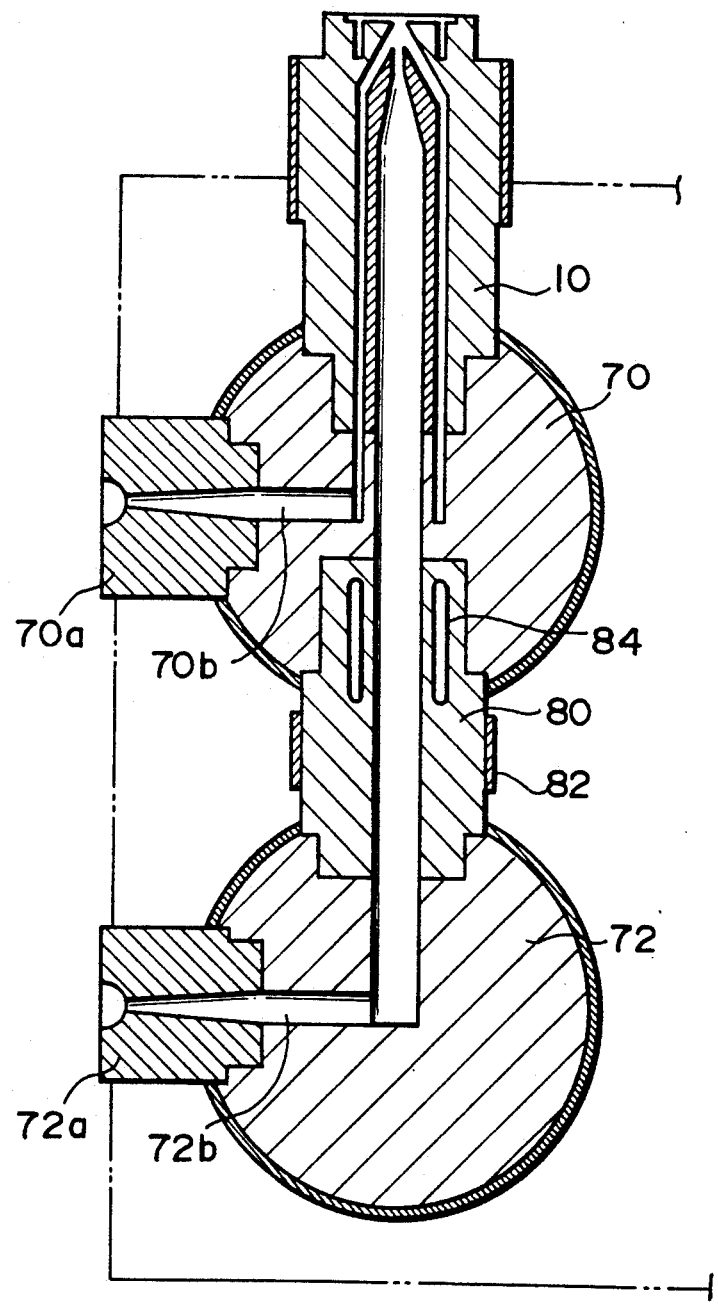

Referring now to FIGS. 3 and 4, there is shown another embodiment of the present invention. First and second hot-runner blocks 70 and 72 are similar to those of the first embodiment in that they are vertically arranged one above another through an air gap or thermal insulation 50. However, the blocks 70 and 72 are of a circular cross-section. The hot-runner blocks 70 and 72 are not of the pressure-balance type, but include resin passages having different lengths from the respective one of sprues 70a or 72a to the exit ports 12 of the respective nozzle bodies 10. Such an arrangement is known as a so-called "comb-type". The second embodiment is distinguished from the first embodiment in that the temperatures of the first and second hot-runner blocks 70 and 72 are controlled by external heater means such as external band heaters 74 and 76. These external band heaters 74 and 76 are similar to those of the first embodiment in that they control the molding temperatures of the respective resin materials passed through or resident in runners 70b and 72b of blocks 70 and 72. In addition, the air gap 50 serves as a thermal insulation for preventing any thermal affection between the adjacent hot-runner blocks and for permitting an accurate and independent adjustment of temperature for the hot-runner blocks. In order to improve the temperature adjustment, the band heaters 74 and 76 may be combined with heat pipes embedded in the blocks 70 and 72.

Each block 80 connecting the resin passages of the blocks 70 and 72 is similarly controlled in temperature by a band heater 82. The connection block 80 also includes an internal cartridge type heater 84 at the end which is embedded in hot-runner block 70. Although such an internal heater 84 is not essential in the present invention, it serves as an effective heater means for maintaining the molding temperature of the resin material conducted through the second hot-runner block 72 immediately before the resin material flows into the second resin passage 22 of the nozzle body 10.

Figure 5:
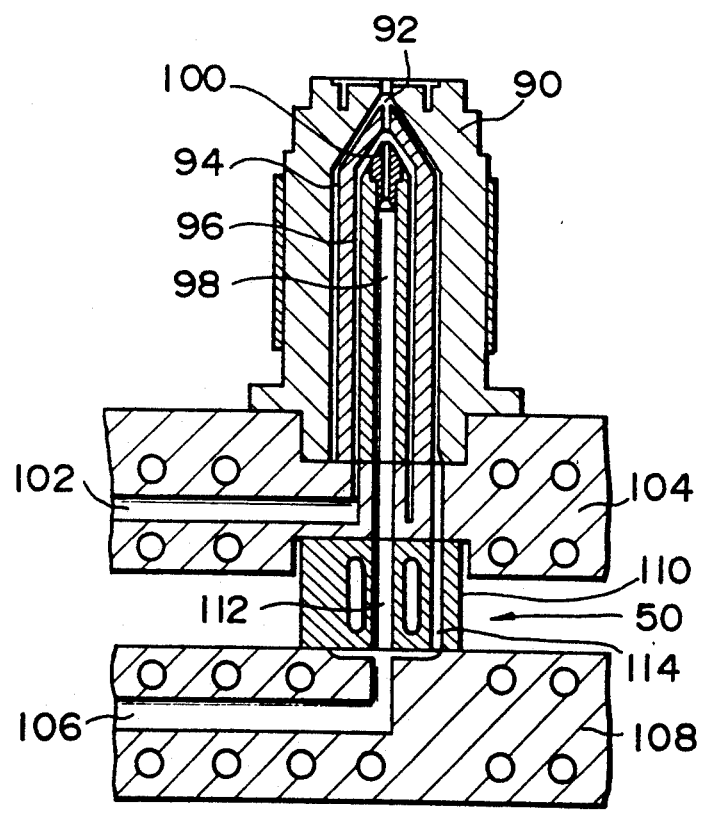
FIG. 5 is a schematic cross-section of a hot-runner mold having a valved triple nozzle to which still another embodiment of the present invention is applied.

FIG. 5 shows still another embodiment of the present invention which is applied to a three-ply molding hot-runner mold having a triple nozzle type nozzle body 90. Such a nozzle body 90 is disclosed in Japanese Patent Laid-Open No. Sho 63-107525 and comprises first, second and third concentrically arranged resin passages 94, 96 and 98 which communicate with a common exit port 92. A valve member 100 for opening and closing the second resin passage 96 is provided to move forwardly and rearwardly under a differential pressure between the resin materials in the second and third resin passages 96 and 98. A resin material used to form the intermediate layer, such as EV-OH resin, is conducted into the second resin passage 96 while PET resin for forming the outer and inner layers is conducted into the first and third resin passages 94 and 98. A first hot-runner block 104 having a runner 102 communicating with the second resin passage 96 is disposed above a second hot-runner block 108 having a runner 106 for conducting the resin material into the first and third resin passages 94 and 98 through the air gap or thermal insulation 50 located therebetween. A connection block 110 is disposed between the upper and lower blocks 104 and 108 to divide the runner 106 of the second hot-runner block 108 into two runner branches 112 and 114 which connect with the first and second resin passages 94 and 98, respectively. Each of these sections includes an independent temperature control means which is similar to that of the first embodiment. Thus, the third embodiment can similarly control the molding temperatures inherent in two different resin materials used for forming the outer, intermediate and inner layers of a three-ply product to assure good moldability. In the third embodiment, particularly, the resin material, which is used to form the intermediate layer with less shot tends to be pyrolytically decomposed. In this embodiment the material can be conducted into the nozzle body 90 through the first or upper hot-runner block 104 having a decreased length of runner from the sprue to the nozzle body 90. The resin material may be exposed to raised temperatures for a period of time which is less than that if the resin material were conducted through a lower block. This leads to reduction of the thermal degradation of the resin material. The first and second embodiments may be modified to supply the resin material for the intermediate layer from the first or upper hot runners 30 and 74.

Although the present invention has been described with respect to some preferred embodiments, it is not limited to such arrangements and can be modified into various possible configurations without departing from the spirit and scope of the present invention.

Although the thermal insulation between the adjacent hot-runner blocks is preferred to be an air gap in view of manufacturing cost, the air gap may be replaced by any other suitable thermal insulation such as ceramic material. The connection block may be formed integral with the lower hot-runner block which is similarly controlled up to a temperature approximate to that of the connection block. Furthermore, the present invention may be similarly applied to any other multi-ply molding hot-runner mold for injection molding a product having four or more layers in cross-section. In such instance, the hot-runner mold is divided into blocks for different resin materials, which are stacked one above another through thermal insulation layers and which are independently controlled in temperature by respective temperature control means.

What is claimed is:

1. A multi-ply molding hot-runner mold comprising:
a nozzle body including a plurality of passages for resin materials, said nozzle body being adapted to merge the flows of resin materials near the exit port thereof;
a plurality of hot-runner blocks stacked one above another through thermal insulation layers, each of said hot-runner blocks including a runner formed therein for conducting a resin material from a sprue into a corresponding resin passage in said nozzle body;
a connection block partially disposed between adjacent hot-runner blocks, said connection block including a runner formed therein for conducting resin material from a lower hot-runner block to an upper hot-runner block, said connection block at least partially imbedded within said upper block to provide an insulated pathway for resin material from said lower block; and
a plurality of temperature control means each capable of independently controlling the temperature of each of said hot-runner blocks so as to adapt the hot-runner block to a molding temperature inherent in a respective one of said resin materials.

2. A multi-ply molding hot-runner mold as defined in claim 1 wherein the thermal insulation between the adjacent hot-runner blocks is an air gap.

3. A multi-ply molding hot-runner mold as defined in claim 1 wherein said nozzle body includes a plurality of concentrically arranged resin passages formed therein and wherein the outermost resin passage of said concentrically arranged resin passages is connected with the runner of the uppermost block, the central resin passage being connected with the runner of the lowermost block, and the temperature control means for adjusting the temperature of said nozzle body up to a level approximate to the temperature of the uppermost block.

4. A multi-ply molding hot-runner mold as defined in claim 1 wherein said nozzle body includes a recess formed therein at the surface of said nozzle body engaged by an injection cavity mold, said recess communicating with the exit port of the nozzle body and wherein said resin material is cooled and solidified in said recess to form a thermal insulation layer between said nozzle body and said injection cavity mold.

5. A multi-ply molding hot-runner mold as defined in claim 4 wherein said nozzle body further includes a ring-shaped slit formed therein to communicate with said recess and to encircle the exit port of said nozzle body and wherein the resin material is cooled and solidified in said ring-shaped slit to form a thermal insulation layer therebetween.

6. A multi-ply molding hot-runner mold as defined in claim 1 wherein said connection block includes temperature control means independent from the plurality of temperature control means of each hot-runner block for controlling the temperature of the connection block up to a level approximate to that of said lower block.

7. A multi-ply molding hot-runner mold as defined in claim 6 wherein the top end of said connection block is embedded in a hole in the upper block and wherein the top end side of said connection block includes said temperature control means.

8. A multi-ply molding hot-runner mold as defined in claim 7 wherein a gap for thermal insulation is formed between the sidewall of the top end of said connection block and the inner wall of the hole of said upper block.

9. A multi-ply molding hot-runner mold as defined in claim 1 wherein the uppermost hot-runner block includes a plurality of nozzle bodies and wherein said connection blocks equal in number to said nozzle bodies are provided between the adjacent hot-runner blocks.

10. A multi-ply molding hot-runner mold as defined in claim 9 wherein said runner formed in each of said hot-runner blocks extends from one of said sprues to the corresponding resin passage in each of the nozzle bodies and is formed in a tournament-table configuration so as to have the same length as those of the other runners.

11. A multi-ply molding hot-runner mold as defined in claim 1, wherein the nozzle body is imbedded in an uppermost hot runner block, the uppermost hot runner block further having a runner for conducting said material from a lower hot runner block to the corresponding resin passage in said nozzle body.

* * * * *